UNITED STATES PATENT OFFICE.

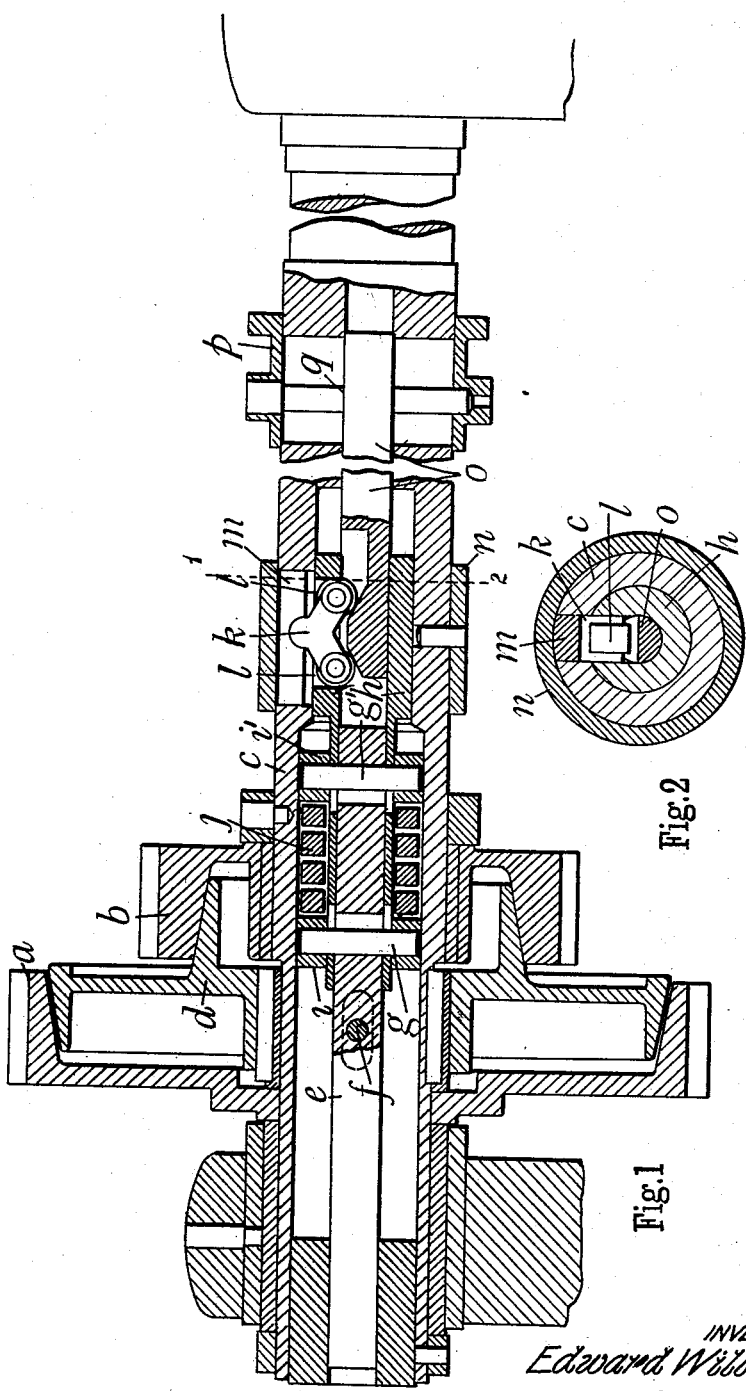

EDWARD WILLIAMS, OF EDGBASTON, BIRMINGHAM, ENGLAND.

CLUTCH.

1,219,207.  Specification of Letters Patent.  Patented Mar. 13, 1917.

Application filed July 27, 1916. Serial No. 111,602.

*To all whom it may concern:*

Be it known that I, EDWARD WILLIAMS, a subject of the King of Great Britain and Ireland, residing at 17 Sandon road, Edgbaston, in the city of Birmingham, England, have invented certain new and useful Improvements Relating to Clutches, of which the following is a specification.

This invention has for its object to construct an improved clutch applicable for a variety of purposes but adapted more especially for use in machine tools such as lathes, milling machines and the like.

The invention comprises the combination with a pair of internally coned outer clutch members freely mounted on a shaft, and a single inner clutch member feather-keyed to the shaft and provided with a pair of oppositely coned parts which can separately engage the corresponding outer members, of a central sliding sleeve which can impart movement to the inner member through a spring and a central rod attached to the said member, and a pivoted thrust piece which can impart movement in either direction to the sleeve from another central rod.

Referring to the accompanying sheet of explanatory drawings:—

Figure 1 is a longitudinal section and Fig. 2 a cross section on 1, 2, (Fig. 1) of a clutch constructed in accordance with this invention, the said clutch being shown applied to the driving shaft of a lathe headstock or other machine tool.

In carrying the invention into effect as shown, a pair of gear wheels *a* and *b* or belt pulleys constituting the outer members of the clutch are each mounted freely on a hollow shaft *c* and provided with an internally coned portion. The inner clutch member *d* is feather-keyed to the shaft and is arranged between the outer members, the said inner member being formed with a pair of opposite externally coned parts which are complementary to the coned parts of the outer members. Within the shaft is arranged a rod *e* connected by a cross pin *f* to the inner member and by a pair of cross pins *g g'* to a sleeve *h*. The outer ends of the latter pins are secured to collars *i i'* on the sleeve and between the collars is arranged a spiral spring *j*. Both the rod *e* and sleeve *h* are slotted adjacent to the pins in such a manner that when the sleeve is moved axially in either direction the movement is transmitted by one of the pins to the spring and thence through the other pin to the rod and inner clutch member.

Actuation of the sleeve is effected by a thrust piece *k* which is preferably provided with a roller *l* at each end and is arranged within a slot in the sleeve. At the center the said piece is fulcrumed on a block *m* contained within a collar *n* on the shaft, and at the side opposite the fulcrum is adapted to be engaged by a central rod *o* which can be moved in either direction along the axis of the shaft by a fork operated collar *p* acting through a pin *q*, or by any other convenient means. The operative end of the said rod is formed with a pair of oppositely inclined edges or surfaces each of which can engage a roller on the thrust piece.

When the rod *o* is moved in one direction it rocks the thrust piece in such a manner that while one end of the said piece is withdrawn from the slot in the sleeve the other end is advanced into the slot and by bearing against the adjacent end of the slot causes to impart an axial movement to the sleeve. This movement is transmitted to the inner clutch member as above described, and one of the clutches is brought into action. The opposite movement of the rod causes a reverse action of the sleeve and the other clutch is then brought into action. When the thrust piece occupies the central position accidental engagement of either clutch is prevented by the abutment of the ends of the slots in the sleeve against the rollers on the thrust piece. Disengagement of the clutch members is effected by the action on the sleeve of the end of the thrust piece opposite to that which produces engagement.

Having thus described my invention what I claim as new and desire to secure by Letters Patent is:—

1. In clutches, the combination comprising a pair of conical driving members, a hollow shaft on which said members are mounted, a driven member secured to the shaft and situated between the driving members, said driven member being adapted to engage either of the driving members, a central sliding rod connected to the driven member, a thrust piece pivoted on the shaft, a sleeve adapted to be moved axially in either direction by the rocking of the thrust piece, means consisting in part of a spring for imparting movement from the sleeve to the driven member through the rod attached to said member, and a central sliding rod adapted to actuate the thrust piece, substantially as described.

2. In clutches, the combination comprising a pair of adjacent internally coned outer driving members, a hollow shaft on which said members are mounted, an inner driven member secured to the shaft and situated between the driving members, said driven member being provided with a pair of externally coned portions for engaging the respective driving members, a central sliding rod connected to the driven member, a sleeve around said rod, a rocking thrust piece fulcrumed in the shaft and located partly within a slot in the said sleeve, rollers on the ends of the thrust piece for acting on the adjacent end of said slot, a pair of collars on the sleeve, cross pins attached to the collars and passing through slots in the sleeve and sliding rod, a spring between the collars, a central sliding rod adapted to operate the thrust piece, and means for actuating the said rod, substantially as described.

In testimony whereof I have signed my name to this specification.

EDWARD WILLIAMS.

Copies of this patent may be obtained for five cents each, by addressing the "Commissioner of Patents, Washington, D. C."